(12) United States Patent
Nettelblad

(10) Patent No.: US 8,946,935 B2
(45) Date of Patent: Feb. 3, 2015

(54) METHOD FOR REDUCING ELECTROMAGNETIC INTERFERENCE RADIATED FROM A POWER SUPPLY ARRANGEMENT

(75) Inventor: Bo Nettelblad, Göteborg (SE)

(73) Assignee: SAAB AB, Linköping (SE)

( * ) Notice: Subject to any disclaimer, the term of this patent is extended or adjusted under 35 U.S.C. 154(b) by 613 days.

(21) Appl. No.: 13/381,873

(22) PCT Filed: Jun. 30, 2009

(86) PCT No.: PCT/SE2009/050844
§ 371 (c)(1),
(2), (4) Date: Mar. 22, 2012

(87) PCT Pub. No.: WO2011/002362
PCT Pub. Date: Jan. 6, 2011

(65) Prior Publication Data
US 2012/0169120 A1    Jul. 5, 2012

(51) Int. Cl.
*H04B 3/00* (2006.01)
(52) U.S. Cl.
USPC .............................................. 307/91; 307/89
(58) Field of Classification Search
USPC .................................................. 307/89, 91
See application file for complete search history.

(56) References Cited

U.S. PATENT DOCUMENTS

| | | | |
|---|---|---|---|
| 5,257,180 A | 10/1993 | Sashida et al. | |
| 6,118,680 A | 9/2000 | Wallace et al. | |
| 2008/0265680 A1 | 10/2008 | Marwali et al. | |

FOREIGN PATENT DOCUMENTS

| | | | |
|---|---|---|---|
| EP | 1324480 A2 | 7/2003 | |
| EP | 1469585 A1 | 10/2004 | |
| EP | 1575156 A2 | 9/2005 | |
| EP | 1983641 A2 | 10/2008 | |

OTHER PUBLICATIONS

Moeller Gmbh: "Moeller Wiring Manual Feb. 2008"; Feb. 1, 2008; pp. 2-22 and 2-23.
Supplementary European Search Report—April 11, 2014 (Issued in Counterpart Application No. 09846908.0).
PCT/ISA/210—International Search Report—Mar. 16, 2010.
PCT/ISA/237—Written Opinion of the International Searching Authority—Mar. 16, 2010.
PCT/IPEA/408—Written Opinion of the International Preliminary Examining Authority—Aug. 2, 2011.
PCT/IPEA/409—International Preliminary Report on Patentability—Nov. 3, 2011.
Moeller, Moeller Wiring Manual Feb. 2008, Moeller GmbH, Feb. 2008.

*Primary Examiner* — Robert L. Deberadinis
(74) *Attorney, Agent, or Firm* — Venable LLP; Eric J. Franklin

(57) ABSTRACT

A method for reducing electromagnetic interference radiated from a power supply arrangement. A plurality of switching mode power supply units are connected to an external device. Each switching mode power supply unit includes a ground point. The radiated electromagnetic interference is reduced by synchronizing a switching frequency of each switching mode power supply unit, such that all of the synchronized switching mode power supply units have an identical switching frequency, thereby reducing the difference in electric potential between the ground points. A corresponding power supply arrangement.

15 Claims, 3 Drawing Sheets

METHOD FOR REDUCING ELECTROMAGNETIC INTERFERENCE RADIATED FROM A POWER SUPPLY ARRANGEMENT

CROSS-REFERENCE TO RELATED APPLICATIONS

This application is the national phase under 35 U.S.C. §371 of PCT/SE2009/050844 filed 30 Jun. 2009.

TECHNICAL FIELD

The present invention relates to a method for reducing electromagnetic interference radiated from a power supply arrangement comprising a plurality of switching mode power supply units connected to an external device. The present invention also relates to a power supply arrangement, which is configured to radiate less electromagnetic interference, and which comprises a plurality of switching mode power supply units connected to an external device.

BACKGROUND ART

Prior art power supply arrangements comprising a plurality of switching mode power supply units connected in parallel to one or several loads by means of shielded conductors generate high electromagnetic interference (EMI). Said EMI can degrade the performance of adjacent electrical or electronic equipment. The terms noise and radio-frequency interference (RFI) are sometimes used in the same context. The EMI generated by the power supply system can be propagated either by conduction via the input and output conductors, by the ground points, or by radiation from the casings and/or conductors.

The known solution to this problem is to apply filters to the output terminals of each power supply unit and/or input terminals of the at least one load. These filters however bring about several problems: They are bulky and have relatively high weight. This problem also increases with the amount of power supplied by the power supply unit, mainly because of the magnetic filter components. This is particularly disadvantageous in airborne, space and other applications where weight and size are important factors. Another problem is that extensive testing of filter component combinations is necessary to accomplish adequate power supply noise reduction, because filter components are not ideal. It is also necessary to perform measurements on the individual power supply units connected in parallel to at least one load to determine if the power supply units comply with EMI regulations. This implies that for testing purposes, you need one filter prototype for each power supply unit in your power supply system. Testing and verification is thus costly and labour intensive.

There is consequently a need for a method for reducing electromagnetic interference radiated from a power supply arrangement, as well as for an improved power supply arrangement, which overcomes the above mentioned problems.

SUMMARY

The object of the invention is to provide an inventive method and power supply arrangement comprising a plurality of switching mode power supply units connected to an external device, wherein each switching mode power supply unit comprises a ground point, where the previously mentioned problems are avoided.

This object is achieved by the inventive method for reducing electromagnetic interference radiated from a power supply arrangement by synchronizing a switching frequency of each switching mode power supply unit, such that all of said synchronized switching mode power supply units have an identical switching frequency, thereby reducing the difference in electric potential between said ground points.

This object is also achieved by a power supply arrangement for reducing electromagnetic interference radiated from said power supply arrangement, wherein the power supply arrangement comprises synchronization means, which is configured to synchronize a switching frequency of each switching mode power supply unit, such that all of said synchronized switching mode power supply units have an identical switching frequency, whereby the difference in electric potential between the ground points is reduced.

BRIEF DESCRIPTION OF THE DRAWINGS

The invention will below be described in connection to a number of drawings, wherein.

DETAILED DESCRIPTION

Figure 1:
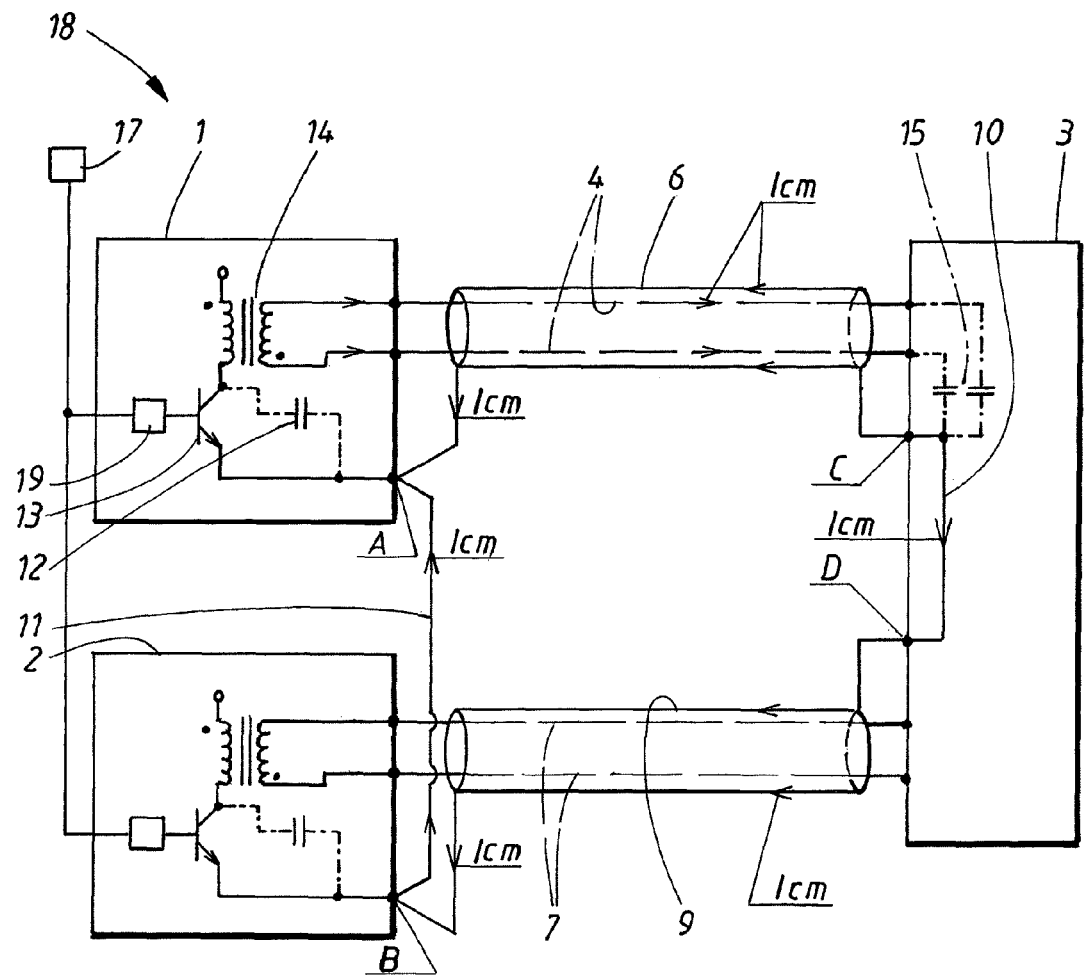
FIG. 1 shows schematically a switching mode power supply system connected to an external device.

FIG. 1 shows a power supply system 18 comprising a first and second switching mode power supply units 1, 2, hereinafter called power supply units 1, 2. Each power supply unit 1, 2 is connected to an external electrical device 3, hereinafter called external device 3. The first power supply unit 1 is connected to the external device 3 by means of first conductors 4, which are surrounded by a first electrically conducting shield 6. The first shield 6 is connected to a first ground point A associated with the first power supply unit 1, and to a third ground point C associated with the external device 3.

Correspondingly, the second power supply unit 2 is connected to the external device 3 by means of second conductors 7, which are surrounded by a second electrically conducting shield 9. The second shield 9 is connected to a second ground point B associated with the second power supply unit 2, and to a fourth ground point D associated with the external device 3. The third and fourth ground points C and D of the external device are mutually connected by means of a first common ground connection 10 associated with the external device, whereas the first and second ground points A and B of the power supply units 1, 2 are mutually connected by means of a second common ground connection 11 associated with the power supply system 18. The power supply system 18 and the external device 3 are thus separately grounded. Said first to fourth ground points A-D can be realised by a connection to the chassis of the associated equipment.

Third and fourth ground points C and D at the external device 3 can of course alternatively be the same point, in which case the first common connection 10 between said ground points C, D becomes superfluous. The invention is not limited to an arrangement where the plurality of power supply units are connected to an external device 3 comprising a single unit, but incorporates also the example where the plurality of power supply units 1, 2 are connected to a plurality of units associated with the external device 3. In such case, the ground points of the plurality of units associated with the external device are mutually connected by a first common ground connection, associated with the external device, such that a current can flow in said first common ground connection between said plurality of units.

The external device 3 can represent a load, a radar unit, a generator, a control unit, or any other type of electrical device. The invention is furthermore not limited to shielded conductors for connecting the external device 3 with the power supply system 18, but said connection can be realised by any type of cable comprising a ground conductor connected to the common ground system of the power supply system 18 as well as the external device 3, for example a three wire cable of which one wire is ground conductor.

The first common ground connection 10 of the external device between third and fourth ground points C and D consists of conducting wires, or of a conducting frame element associated with the external device 3, or a combination thereof. Correspondingly, the second common ground connection 11 of the power supply units 1 and 2 between first and second ground points A and B consists of conducting wires, or of a conducting frame element associated with the power supply units 1 and 2, or a combination thereof.

A switching mode power supply unit 1, 2 normally suffers from the problem of generating high electromagnetic interference EMI due to its switching characteristics. The EMI generated by the power supply unit 1, 2 can subsequently be propagated to other electrical equipment either by conduction via the electrical terminals, or by radiation from the unit's casing. The problem is more relevant in high power applications, i.e. power supply systems supplying more than 1 kW, or more than 10 kW. Such a power supply system can preferably be used for supplying power to a radar system, especially an airborne radar system, and more specifically a radar system used in an airborne early warning and control system.

The invention is based on the finding, that radiated EMI from multiple switching mode power supply units is closely related to the common-mode currents of the power supply arrangement. A common-mode current is an unwanted current that flows into or out of electrical equipment by the ground connections. Furthermore, the amount of radiated EMI is partly a function of a loop area in said power supply arrangement, in which the common-mode currents are flowing, as will be explained hereinafter in more detail.

In FIG. 1, a common-mode current $I_{cm}$, generated for example by stray capacitance inside the power transformer 14 of the first power supply 1, will flow in the first conductors 4 from the first power supply 1 to the external device 3. At the external device 3, the common-mode current $I_{cm}$ will flow into the first common ground connection 10, for example by means of a capacitive coupling between the first conductors 4 and the first common ground connection 10. This coupling is indicated by equivalent capacitances 15. Finally, the common-mode current $I_{cm}$ will return to the first power supply 1 by means of the first shield 6 or the second shield 9 and the second common ground connection 11, forming two current loops.

Theoretically, most of the common-mode current will return in the route having the least impedance, which normally is the shield connected to the power supply unit that generated the common-mode current, but some part of the current will return through other parts, unless there is equal electric potential at first and second ground points A and B in FIG. 1. In practice, the electric potential at first and second ground points A and B varies with time due to the switching of the switching transistor 13 in the power supply 1. Consequently, the route of the common-mode currents $I_{cm}$ will largely be affected by the difference in electric potential at first and second ground points A and B.

One of the main sources of differential potential at first and second ground points A and B in switched mode power supply units is capacitive coupling of the switching signal between the switching transistor 13 and its heat exchanger. Said capacitive coupling is illustrated by a capacitor 12 in the first power supply unit 1 in FIG. 1. The heat exchanger is normally attached to the chassis of the power supply units 1, 2, which is connected to the ground of the power supply unit 1. The change in electric potential over time due to the switching signal in each individual power supply units 1 and 2 will consequently be coupled to the first and second ground points A and B respectively.

From the above reasoning, it is immediately apparent that if the individual power supply units 1 and 2 operate with different switching frequencies, the electric potential at first and second ground points A and B will inevitably be different over time, such that common-mode current $I_{cm}$ generated by power supply 1 will return more or less in the first shield 6 as well as in the second shield 9, all depending in the current electric potential situation.

Figure 2:
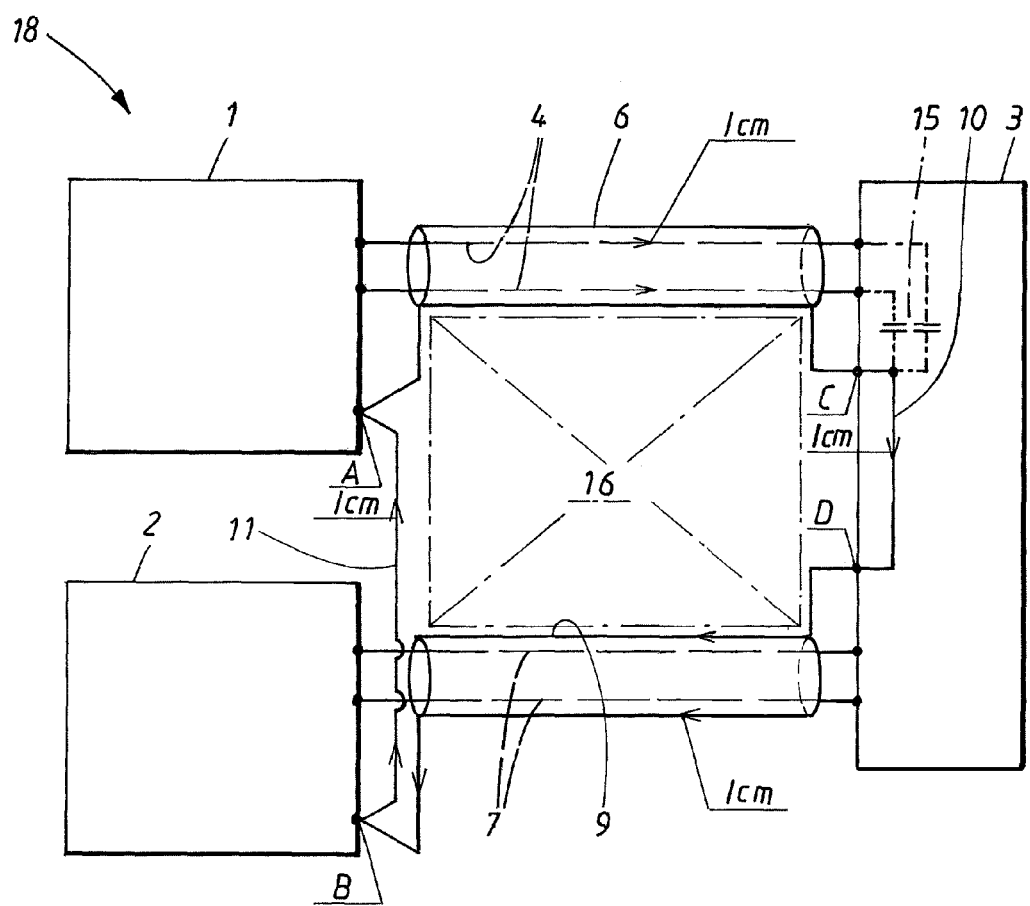
FIG. 2 shows schematically a system according to FIG. 1, where a common-mode current is returning mainly in a shield not belonging to the power supply generating said common-mode current.

FIG. 2 shows an example of a plurality of switching mode power supply units 1, 2 connected to an external device 3 having a first common ground connection 10, where the electric potential is lower in the second ground point B than in the first ground point A, such that the common-mode current $I_{cm}$ generated by the first power supply unit 1 will flow in the first conductors 4, and then return via the first common ground connection 10, second shield 9, second common ground connection 11 to ground point A, and finally back to the power transformer 14 of the first power supply 1. This current loop, which conducts high frequency switching currents, will radiate relatively high EMI, because the electro magnetic coupling is a strong function of a current loop area 16, which is delimited by first conductors 4, first common ground connection 10, second shield 9, and second common ground connection 11. This effect can be illustrated by considering the current loop to represent an antenna.

Figure 3:
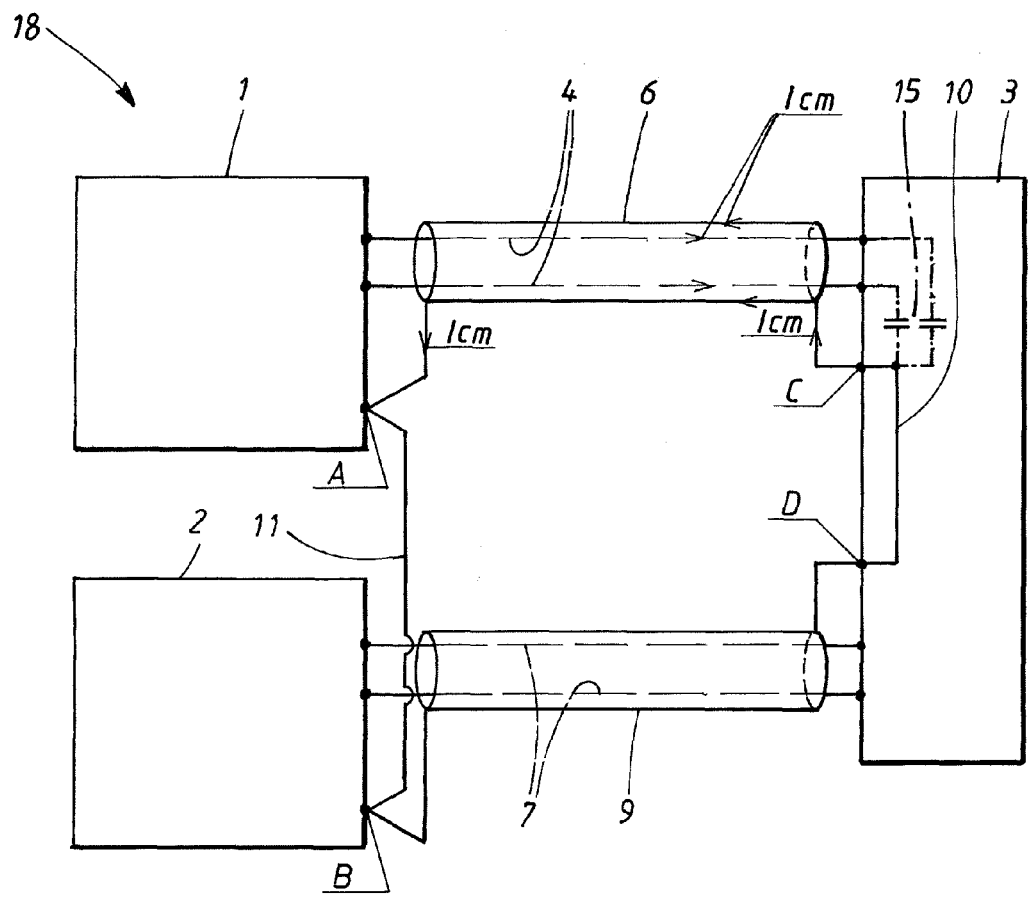
FIG. 3 shows schematically a system according to FIG. 1, where a common-mode current is returning mainly in a shield belonging to the power supply generating said common-mode current.

According to the invention, the amount of radiated EMI is reduced by reducing the antenna effect. This is accomplished by attempting to control the generated common-mode currents $I_{cm}$, such that they will return mainly in the shield belonging to the power supply that generated them. The inventive concept is realized by synchronizing the switching frequencies of the individual power supply units, such that differences in potential over time at first and second ground points A and B will be reduced. If the individual power supply units operate with identical switching frequencies, the difference in potential at first and seconds ground points A and B will be reduced. Such a situation is shown in FIG. 3, where the switching frequencies are synchronized, such that the potential is nearly identical in first and second ground point A and B. The common-mode current $I_{cm}$ generated in the power transformer 14 of first power supply 1 will consequently flow in the first conductors 4, and then return via the first shield 6 to the first ground point A, and finally back to the power transformer 14 of the first power supply unit 1. This reduced current loop will, due to the practically non-existing loop area, radiate much less EMI.

Synchronization means, which is configured to synchronize the power supply units 1, 2 can be implemented in various ways, for example by means of an external control unit 17, which controls the switching frequency of each power supply unit 1, 2. In that case, synchronization signals will be supplied from the external control unit 17 to a switching regulator 19 of each power unit 1, 2 of the power supply system 18. Said switching regulator 19 subsequently supplies a synchronized switching frequency signal to the switching transistor 13. A more robust design (not shown) for implementing the synchronization means would be to configure one single power supply unit to operate a master unit, which synchronizes the switching frequencies of all remaining slave power supply units in the power supply system be means of synchronization signals supplied to said remaining slave power supply units. The latter design is more robust, since if the master/slave concept fails, the power supply units can continue to operate in an unsynchronized mode.

In certain circumstances, it might be desirable also to synchronize the phase of the oscillating switching frequency signals of each power supply unit 1, 2 of the power supply system 18, in addition to synchronizing the switching frequencies. Additional phase synchronization, such that the switching frequency signals of all power supply units 1,2 exhibit substantially no phase difference, further reduces differences in potential over time at first and second ground point A and B of the power supply system 18. The term substantially above is minimal and refers to occasional synchronization signal propagation delays due to the physical distance between the power supply units 1, 2. The phase synchronization can for example be performed by means of the external control unit 17 or by means of the master/slave concept described hereinbefore.

The external device 3 according to the invention can be represented by a single electrical unit, or by a plurality of electrical units interconnected by means of a first common ground connection 10 associated with the external device 3. The external electrical units can be represented by one or more loads, radar units, generators, control units, or any other type of electrical units.

The invention is not limited to a Flyback type of power supply unit 1, 2 as depicted in the figures, but is equally applicable to all types switching mode power supply units, for example Buck, Boost, Forward, Full bridge etc. Furthermore, the invention is not limited to a power supply system 18 comprising only two power supply units 1, 2, but is equally applicable to any number of plural power supply units.

Only the common-mode current $I_{cm}$ generated by the first power supply 1 is illustrated in FIGS. 2 and 3, but common-mode currents will be generated by all operating power supply units 1, 2 of the power supply system (18).

The term electric potential at a certain point means the voltage difference between said certain point and the associated common ground point.

The first and second electric conductors 4,7 can comprise a pair of conductors, for example for supplying AC or DC to the external device 3, or for receiving AC or DC from the external device 3, or for sending and/or receiving control signals to/from an external device 3.

The ground points A, B associated with the power supply units 1,2 can be represented by ground terminal points normally located outside the power supply unit 1,2, together with other terminal means like power output terminals, control terminals etc. The ground points C, D associated with the external device 3 can be represented by ground terminal points of the external device 3.

Since FIGS. 2 and 3 merely function to illustrate the common-mode currents $I_{cm}$ in the circuits without or with switching frequency synchronization, neither the details of the power supply units 1, 2 nor the synchronization means are illustrated in the schematic FIGS. 2 and 3.

The invention is not limited to the embodiments and examples described above, but may wary freely within the scope of the appended claims.

The invention claimed is:

1. A method for reducing electromagnetic interference radiated from a power supply arrangement comprising a plurality of switching mode power supply units connected to an external device, wherein each switching mode power supply unit comprises a ground point, the method comprising:
   connecting each switching mode power supply unit to said external device with conductors, and a ground conductor associated with said conductors, such that a first ground conductor is connected to a first ground point of a first switching mode power supply unit, and a second ground conductor is connected to a second ground point of a second switching mode power supply unit;
   mutually connecting said first and second ground conductors with a first common ground connection associated with the external device, and with a second common ground connection associated with the switching mode power supply units, thereby providing a ground-loop, comprising a first ground conductor, a first common ground connection, a second ground conductor and a second common ground connection; and
   synchronizing a switching frequency of each switching mode power supply unit, such that all of said synchronized switching mode power supply units have an identical switching frequency, and such that a common-mode current generated by each switching mode power supply unit is controlled to return mainly in the ground conductor associated with said switching mode power supply unit that generated said common-mode current, thereby reducing a difference in electric potential between said ground points.

2. The method according to claim 1, wherein the first and second ground conductors are represented by first and second electrically conducting shields surrounding first and second conductors respectively.

3. The method according claim 1, further comprising:
   synchronizing a phase of a switching frequency signal of each switching mode power supply unit in the power supply arrangement, such that the switching frequency signals of all switching mode power supply units exhibit substantially no phase difference.

4. The method according to claim 1, further comprising:
   synchronizing the switching mode power supply units
   utilizing an external control unit that controls the switching frequency, and optionally also a phase of a switching frequency signal, of each switching mode power supply unit in the power supply arrangement, or
   utilizing a single switching mode power supply unit operating as a master unit, which master unit controls the switching frequencies, and optionally also the phase of switching frequency signals, of all remaining switching mode power supply units in the power supply arrangement.

5. The method according to claim 1, wherein the plurality of switching mode power supply units form a power supply system, and said power supply system supplies more than 1 kW to at least one external load, wherein said external load is a radar system.

6. The method according to claim 5, wherein said power supply system supplies more than 10 kW.

7. The method according to claim 5, wherein said external load is an airborne radar system.

8. A power supply arrangement, comprising:
a plurality of switching mode power supply units, which are connected to an external device, wherein each switching mode power supply unit comprises a ground point,
conductors and a ground conductor associated with said conductor, wherein each switching mode power supply unit is connected to said external device with the conductors, and with the ground conductor;
a first ground conductor connected to a first ground point of a first switching mode power supply unit,
a second ground conductor connected to a second ground point of a second switching mode power supply unit,
a first common ground connection associated with the external device and a second common ground connection associated with the switching mode power supply units, wherein said first and second ground conductors are mutually connected with the first common ground connection and with the second common ground connection, thereby providing a ground-loop, comprising first ground conductor, first common ground connection, second ground conductor and second common ground connection; and
a synchronizer configured to synchronize a switching frequency of each switching mode power supply unit, such that all of said synchronized switching mode power supply units have an identical switching frequency, and such that a common-mode current generated by each switching mode power supply unit is controlled to return mainly in the ground conductor associated with said switching mode power supply unit that generated said common-mode current, whereby the difference in electric potential between the ground points is reduced.

9. The power supply arrangement according to claim 8, wherein the synchronizer is configured to synchronize a phase of a switching frequency signal of each switching mode power supply unit of the power supply arrangement, such that switching frequency signals of all switching mode power supply units are arranged to exhibit substantially no phase difference, whereby the difference in electric potential between the ground points associated with each switching mode power supply unit is further reduced.

10. The power supply arrangement according to claim 8, wherein the synchronizer is arranged to synchronize the switching mode power supply units, and wherein in the synchronizer comprises
an external control unit, which is configured to control the switching frequency, and optionally also a phase of a switching frequency signal, of each switching mode power supply unit in the power supply arrangement, or
a single switching mode power supply unit that is configured to operate as a master unit, which master unit is configured to control the switching frequencies, and optionally also a phase of switching frequency signals, of the remaining slave switching mode power supply units in the power supply arrangement.

11. The power supply arrangement according to claim 8, wherein the external device can be represented by at least one load unit, generator unit, control unit, or any other type of electrical unit.

12. The power supply arrangement according to claim 8, wherein
a first power supply unit is connected to the external device with first conductors and a first ground conductor,
a second power supply unit is connected to the external device with second conductors and a second ground conductor, and
the first and second ground conductors are represented by first and second electrically conducting shields surrounding first and second conductors respectively.

13. The power supply arrangement according to claim 8, wherein the plurality of switching mode power supply units form a power supply system, which is configured to supply more than 1 kW to at least one external load, wherein said external load is a radar system.

14. The power supply arrangement according to claim 13, wherein said power supply system supplies more than 10 kW.

15. The power supply arrangement according to claim 13, wherein said external load is an airborne radar system.

* * * * *